United States Patent
Wang

(10) Patent No.: US 7,016,266 B2
(45) Date of Patent: Mar. 21, 2006

(54) SHARING DEVICE FOR MULTIPLE AUDIO SOURCES

(76) Inventor: Ying-Cou Wang, 6F, No. 19, Sec. 3, Nanking E. Rd., Taipei (TW)

( * ) Notice: Subject to any disclaimer, the term of this patent is extended or adjusted under 35 U.S.C. 154(b) by 569 days.

(21) Appl. No.: 10/303,966

(22) Filed: Nov. 26, 2002

(65) Prior Publication Data

US 2004/0100875 A1    May 27, 2004

(51) Int. Cl.
*H04B 1/20*    (2006.01)
(52) U.S. Cl. ............................................. 369/2; 381/81
(58) Field of Classification Search ..................... None
See application file for complete search history.

(56) References Cited

U.S. PATENT DOCUMENTS

| | | | |
|---|---|---|---|
| 4,876,719 A * | 10/1989 | Nakagami et al. ............. 369/4 |
| 5,361,381 A * | 11/1994 | Short ........................... 381/80 |
| 5,363,434 A * | 11/1994 | Farinelli et al. .............. 381/81 |
| 5,440,644 A * | 8/1995 | Farinelli et al. .............. 381/81 |
| 5,444,676 A * | 8/1995 | Balsamo et al. ............... 369/4 |
| 5,666,428 A * | 9/1997 | Farinelli et al. .............. 381/81 |
| 5,768,126 A * | 6/1998 | Frederick ...................... 369/4 |
| 5,917,781 A * | 6/1999 | Kim ............................. 369/4 |
| 5,953,429 A * | 9/1999 | Wakai et al. ................. 381/77 |
| 6,757,302 B1 * | 6/2004 | Lydon et al. .............. 381/119 |
| 6,801,630 B1 * | 10/2004 | Shibata ..................... 381/119 |
| 6,804,504 B1 * | 10/2004 | Johnson et al. ............ 381/394 |
| 6,862,429 B1 * | 3/2005 | Efron et al. ................. 381/82 |

* cited by examiner

*Primary Examiner*—Tan Dinh
(74) *Attorney, Agent, or Firm*—Rosenberg, Klein & Lee

(57) ABSTRACT

A sharing device is composed of a distributor and multiple output units. The distributor has multiple input ports to connect different audio sources, such as VCD/DVD players, and has multiple output ports to correspondingly connect to the multiple output units. Each output unit is further connected with a sound output device, e.g. speakers, to broadcast audio signals. When the multiple output units are distributed at different locations, a user in any place is able to select a desired audio source by controlling the output unit and listen to music provided by the selected audio source.

6 Claims, 7 Drawing Sheets

SHARING DEVICE FOR MULTIPLE AUDIO SOURCES

BACKGROUND OF THE INVENTION

1. Field of the Invention

The invention is related to a sharing device for multiple audio sources, and more particularly to a sharing device with multiple output units to individually broadcast one selected audio signal from different audio sources collectively input to the sharing device.

2. Description of Related Arts

Whether in the city or countryside, modern people are so busy that activities related to the video or audio entertainment have became very general choices in people's leisure time. To release working pressure, most people would like go to the movies on the weekend, or choose a music disc and enjoy that at home and so to purchase different kinds of video/audio display devices is very popular.

These video/audio devices, including the VCD player, DVD player or the portable sound device, usually are operated independently. To integrate these facilities together, an adopted manner is to connect all output terminals of these facilities to a speaker set, wherein the speaker set is provided as a common output device of sound.

However, the foregoing way still has some disadvantages. Since all facilities share a single sound output device, only one of the multiple video/audio devices is selected and operated. If the operator intends to choose a particular device among these, the original operated device must be turned off and then switch to the desired one.

Moreover, by using the single speaker set as the sound output device, because the speaker set is usually disposed in a particular place, e.g. the living room, it is inconvenient to utilize and operate the speaker set for people in other places, for example their individual room.

To overcome the mentioned shortcomings, a sharing device for multiple audio sources in accordance with the present invention obviates or mitigates the aforementioned problems.

SUMMARY OF THE INVENTION

The objective of the present invention is to provide a sharing device for multiple audio sources, wherein the multiple audio sources are allowed to operate at the same time, and one of which is selected to be broadcast based on user's choice.

To achieve the objective, the sharing device in accordance with the present invention comprises:

a distributor, with multiple input ports and multiple output ports, wherein each input port is adapted to connect with an audio source;

multiple output units correspondingly and respectively connected to the multiple output ports, wherein each output unit is connected to a sound output device;

wherein each output unit is equipped with a channel selecting button for choosing one audio source to be broadcast through the sound output device.

Each output unit is further provided with a volume tuner to control the output sound intensity of the connected sound output device.

The multiple output units are respectively distributed in different locations.

The connection between the distributor and each multiple output unit is constructed by the use of a cable with advantages of low insertion loss and low cross talk.

The features and structure of the present invention will be more clearly understood when taken in conjunction with the accompanying figures.

DETAILED DESCRIPTION OF THE PREFERRED EMBODIMENT

Figure 1:
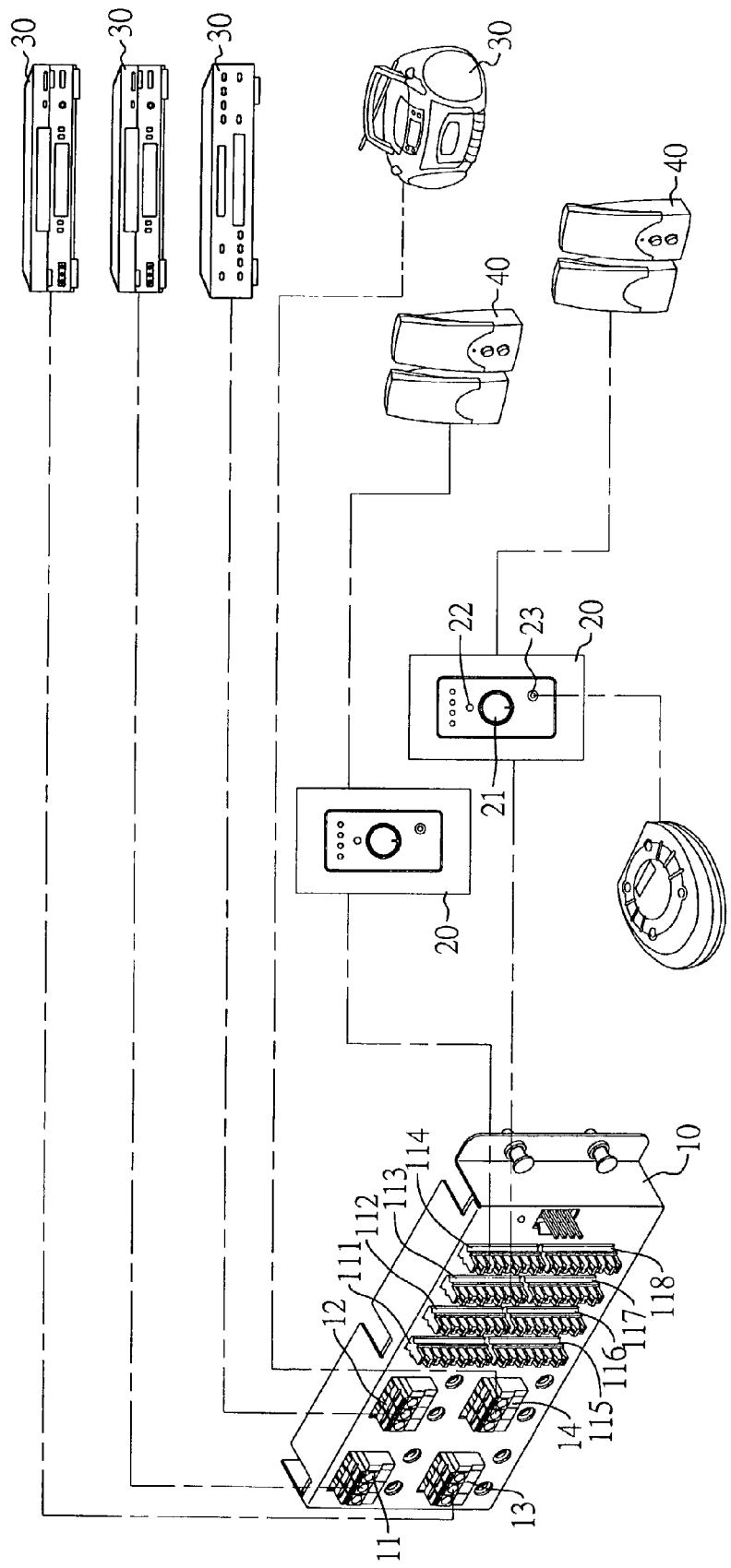
FIG. 1 is an operational view of a sharing device in accordance with the present invention accompanying with multiple audio sources.

With reference to FIG. 1, a sharing device in accordance with the present invention is operated with multiple audio sources (30), such as a VCD, DVD or CD player. The sharing device is composed of a distributor (10) and multiple output units (20). Multiple input ports (11–14) are formed on the distributor (10) to respectively connect to a respective one audio source (30). The distributor (10) further has multiple output ports (111–118) for connection to multiple sound output devices (40) through the output units (20), respectively. The connection between the distributor (10) and the output units (20) is performed by the use of cable lines, wherein the cable lines have the advantages of low signal insertion loss and low cross talk etc.

A sound volume tuner (21) to adjust the output sound intensity of the connected sound output device (40) is provided on each output unit (20). Each output unit (20) further has a channel selecting button (22) to select one audio source (30) to be broadcast. By continually and sequentially pressing the selecting button (22), one desired audio source (30) is selected among the multiple audio sources (30). A voice input jack (23) is designed on the output unit (20) to directly receive an external sound signal from an external audio source, such as a CD player.

The application of the sharing device has different varieties. Actually, when each output unit (20) in conjunction with one sound output device (40) is placed and installed inside the room, people can individually switch to a desired audio source (30) and listen the music output therefrom.

Figure 2:
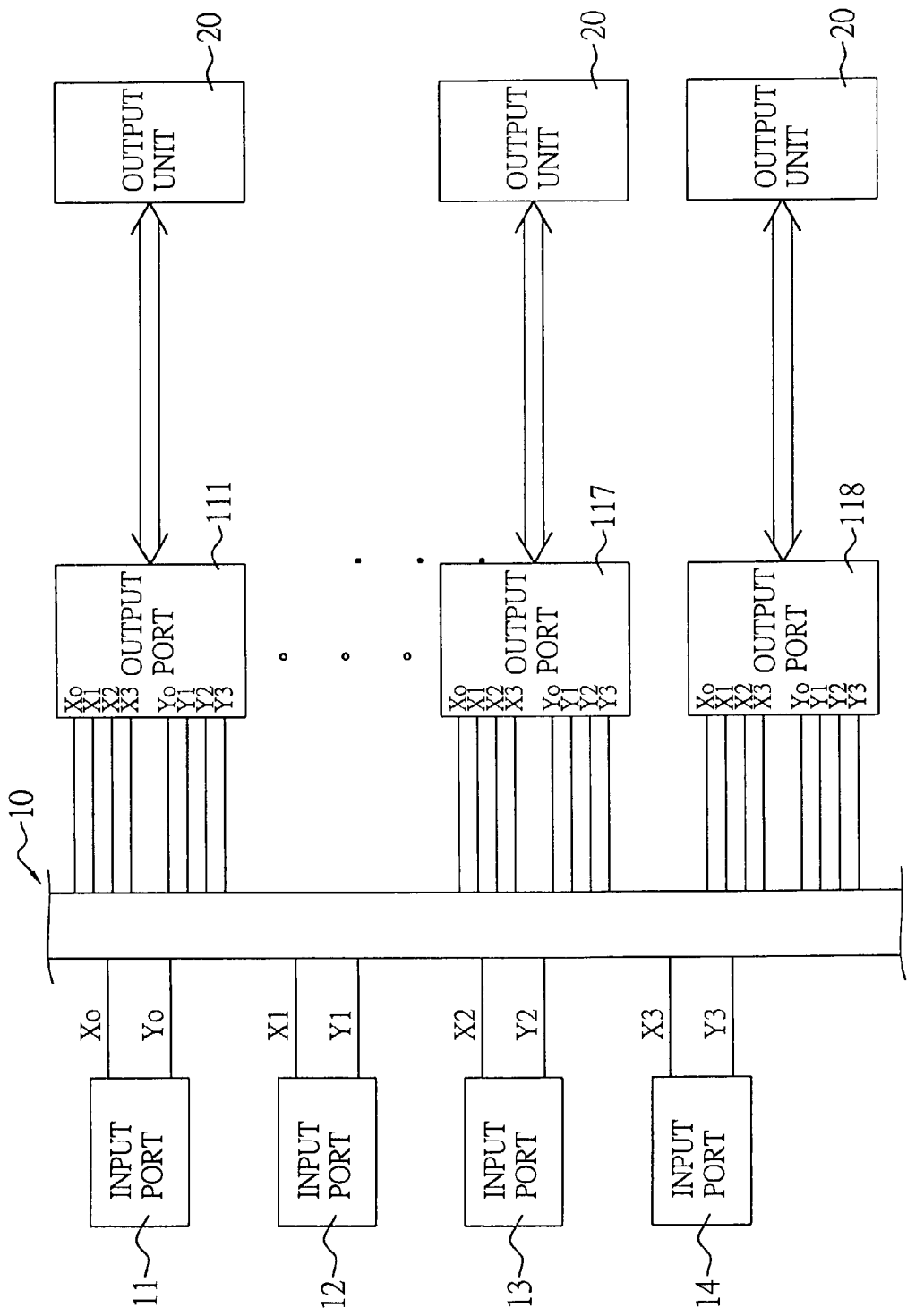
FIG. 2 is a block diagram of the sharing device in accordance with the present invention.

With reference to FIG. 2, the distributor (10) in this embodiment has four input ports (11–14) and eight output ports (111–118). Each input port (11–14) utilizes two select pins Xn and Yn (where n=0–3) to correspondingly connect to two select pins Xn and Yn of each output port (111–118). For example, the two select pins $X_0$ and $Y_0$ of the first input port (11) are corresponding to the two select pins $X_0$ and $Y_0$ of each output port (111–118), wherein the remaining select pins ($X_1$–$X_3$ and $Y_1$–$Y_3$) of the input ports (12–14) are connected to each output port (111–118) in the same manner. When the channel selecting button (22, shown in FIG. 1) of the output unit (20) is pressed, switching signals are generated and output to one corresponding output port (111–118) to choose audio signals of one input port (11–14).

Figure 3:
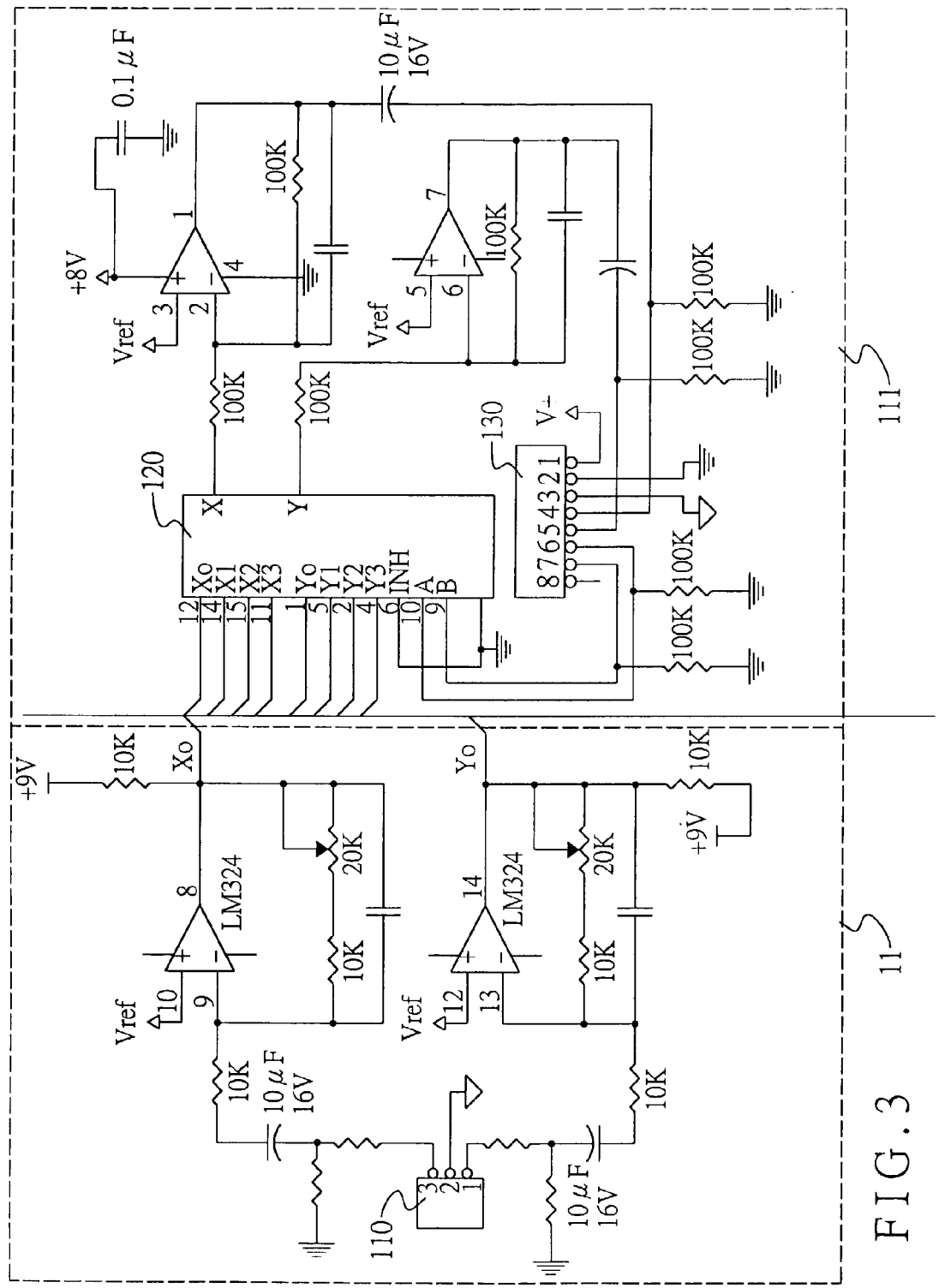
FIG. 3 is a circuit diagram showing one input port and one output port provided on a distributor in accordance with the present invention.
Figure 4A:
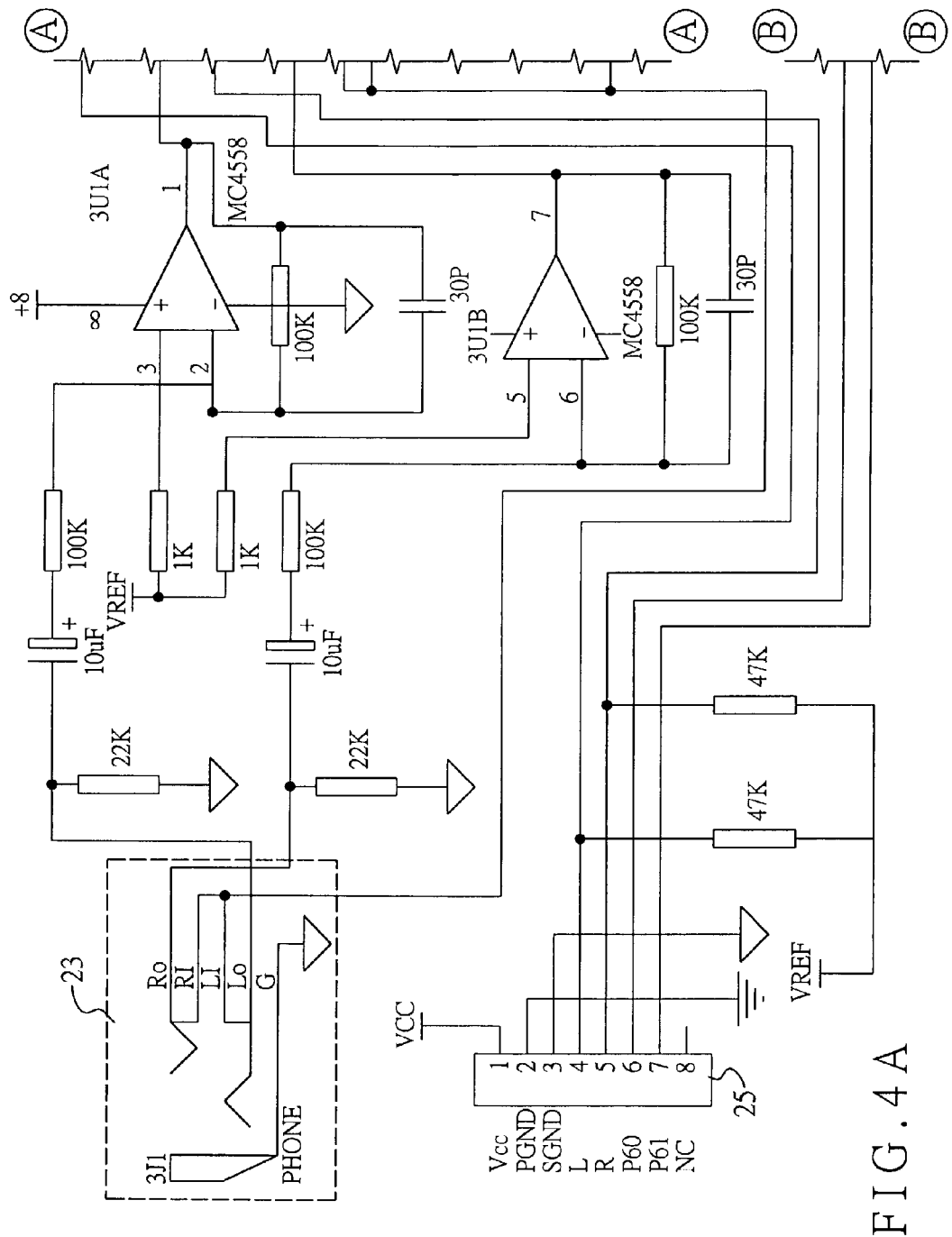
FIGS. 4A–4D is circuit diagram of one output unit in accordance with the present invention.
Figure 4B:
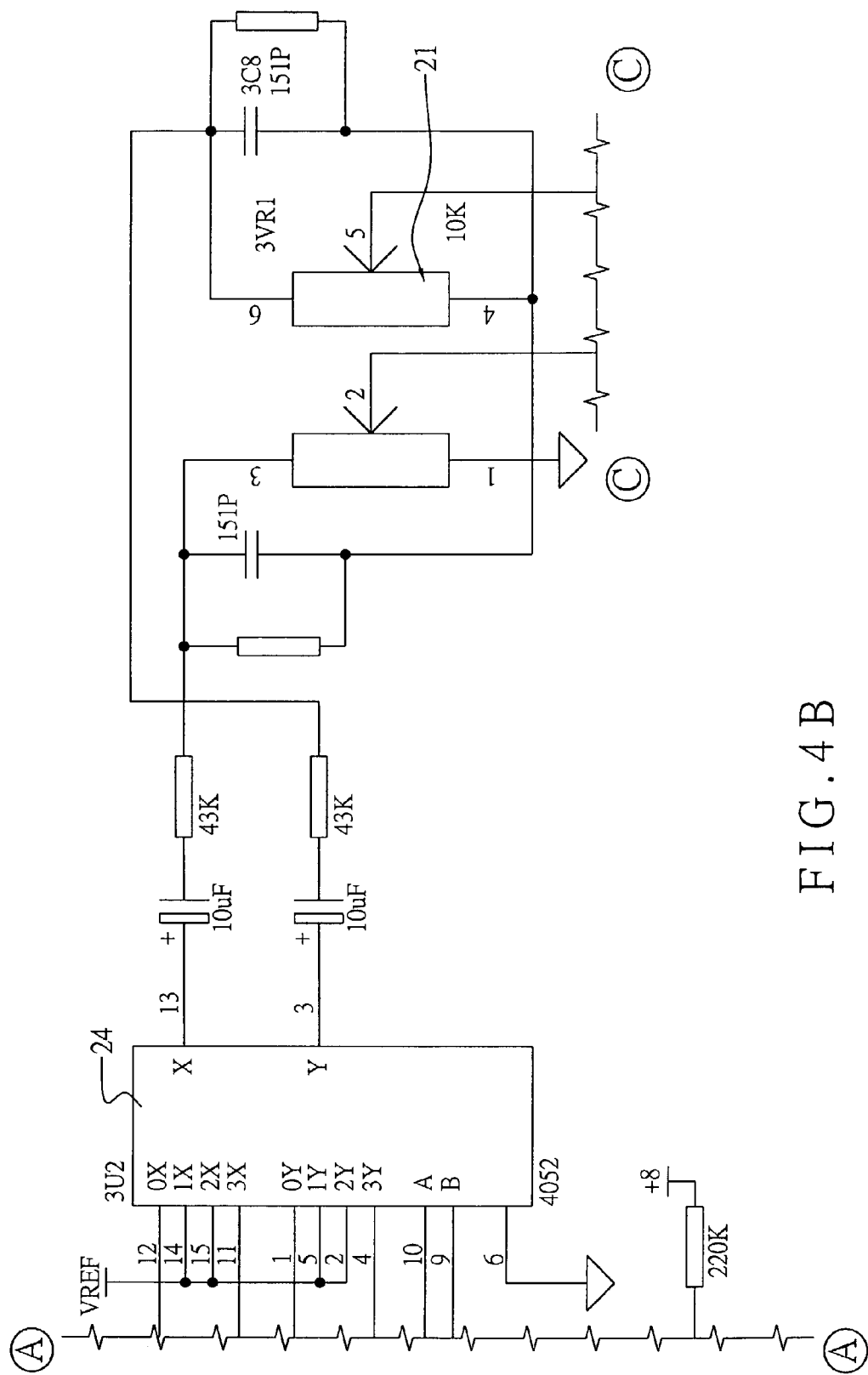
Figure 4C:
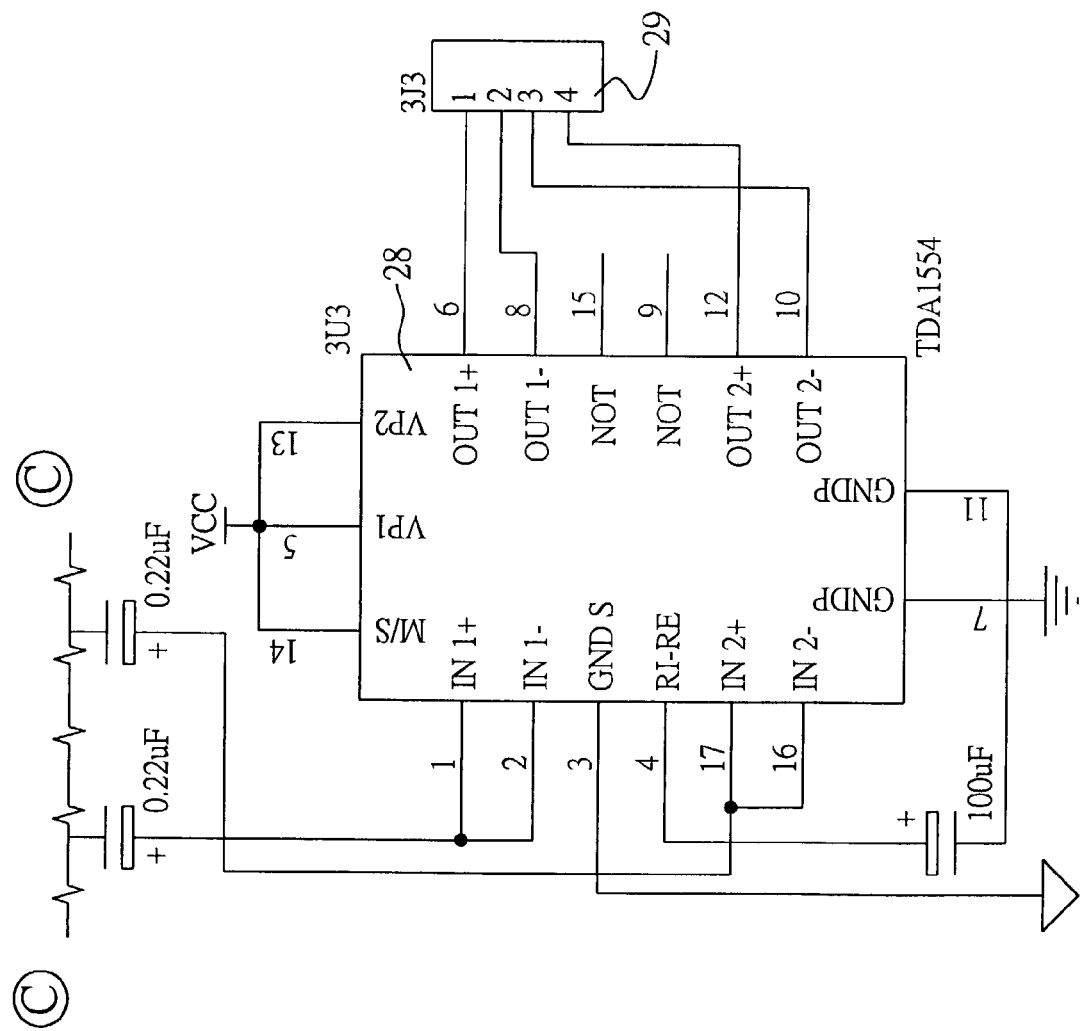
Figure 4D:
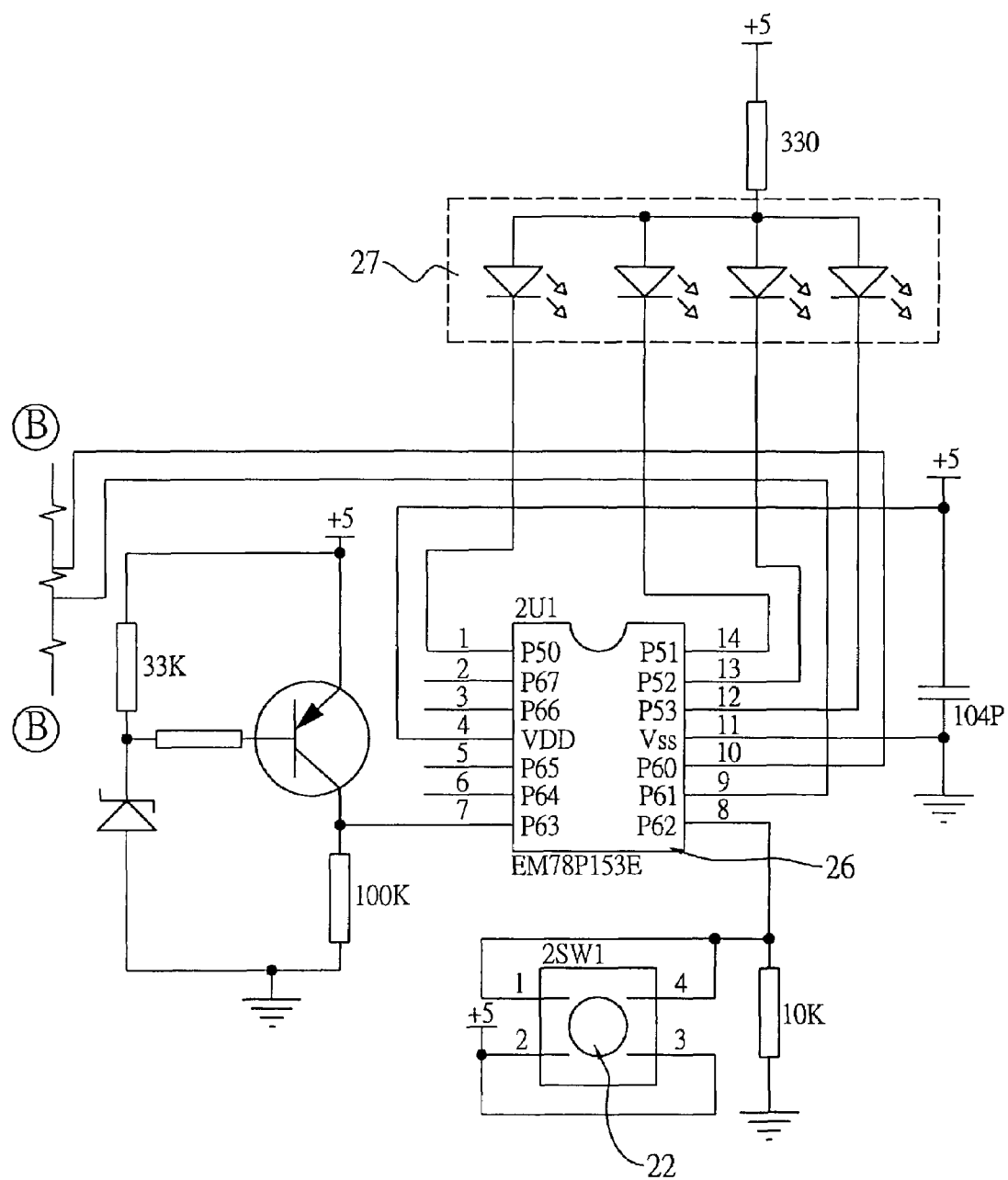

With reference to FIG. 3, in order to concisely explain the operation of the circuit, only the first input port (11) and the first output port (111) are illustrated and described. Since the remaining input ports (12–14) and the remaining output ports (112–118) have the same circuit as shown in FIG. 3, their descriptions are omitted hereinafter.

The input ports (11) have a first connector (110) for connection to one audio source (30), wherein two terminals in the first connector (110) are respectively connected to two operational amplifiers. The output terminals of the two operational amplifiers are used as the select pins $X_0$ and $Y_0$ for connection to the output port (111).

The output port (111) mainly comprises a first multiplexer (120) and a sound input connector (130). The input pins $X_0$–$X_3$, and $Y_0$–$Y_3$ of the first multiplexer (120) are for connection to the select pins of the input port (11). Further, two control pins (A, B) of the multiplexer (120) are connected to the output unit (20, shown in FIG. 2) through the sound input connector (130).

With reference to FIGS. 4A–4D, the output unit (20) includes a second multiplexer (24), a switching chip (26), and a D/A converter (28).

The second multiplexer (24) has two input terminals 0X and 0Y connecting to the sound input jack (23) and two input terminals 3X and 3Y for connection to the sound input connector (130) of the distributor (10) through a second connector (25). Two control terminals A and B of the multiplexer (24) are connected to the sound input jack (23).

The switching chip (26) has one input terminal for receiving the switching signals from the channel selecting button (22) and two output terminals for connection to the distributor (10) through the second connector (25). Further, the switching chip (26) has four output terminals to respectively connect to four LEDs (27), wherein the four LEDs (27) are employed as the indicating lights to identify which audio source (30) is chosen.

The D/A converter (28) has input terminals connect to the second multiplexer (24) through the volume tuner (21), wherein output terminals of the D/A converter (28) are connected to the sound output device (40), such as speakers, through a third connector (29).

With reference to FIGS. 1, 3 and 4, the sharing device of the present invention has two operation modes that are determined by whether the sound input jack (23) is connected with an external audio source, such as the CD player.

First mode: The sound input jack (23) is not connected with an external audio source. Since the control terminals A and B of the second multiplexer (24) of the output unit (20) are retained at a high voltage level, audio signals are input to the terminals 3X and 3Y. That is to say, the audio signals from the audio source (30) are sequentially input through the sound input connector (130) and the second connector (25) to the second multiplexer (24).

When the channel selecting button (22) of the output unit (20) is pressed, the switching chip (26) sends the switching signals through the second connector (25) and the voice input connector (130) to the first multiplexer (120). After the control pins A, B of the first multiplexer (120) receive the switching signals, the first multiplexer (120) choose audio signals from Xn and Yn (n=0–3) based on the switching signals Second mode: The sound input jack (23) is connected with an external audio source. Since the control terminals A and B of the second multiplexer (24) are forced to connect to ground, audio signals are input to the input terminals 0X and 0Y, i.e. the audio signals received by the second multiplexer (24) are directly provided from the sound input jack (13). The audio signals are then transmitted to the D/A converter (28) and output through the third connector (29) to be broadcast by audio output device (40).

Whatever operation mode is chosen, the output sound volume is able to be adjusted by properly controlling the volume tuner (21).

The foregoing description of the preferred embodiments of the present invention is intended to be illustrative only and, under no circumstances, should the scope of the present invention be restricted by the description of the specific embodiment.

What is claimed is:

1. A sharing device for multiple audio sources, the sharing device comprising:

a distributor with multiple input ports and multiple output ports, wherein each input port is adapted to connect with the audio source, each input port of the distributor having a first connector adapted to connect to the audio source, the first connector having two terminals respectively connected to two operational amplifiers, the two operational amplifier having two output terminals as first select pins, each output of the distributor having a first multiplexer with input terminals connected to the first select pins; and multiple output units respectively connected to the multiple output ports, wherein each output unit is connected to a sound output device, each first multiplexer having output terminals connected to a corresponding output unit through a sound input connector; each output unit including:

a channel selecting button to select one audio source from the multiple audio sources;

a second multiplexer having first input terminals for connection to the sound input jack and having second input terminals for connection to the sound input connector through a second connector;

a switching chip having an input terminal to connect to the channel selecting button and having two output terminals to connect to the distributor through the second connector; and a D/A converter connected to the second multiplexer through the volume tuner, wherein the D/A converter is further connected to the sound output device through a third connector; wherein the second multiplexer further has two control pins connected to the sound input jack.

2. The sharing device as claimed in claim 1, wherein each output unit has a volume tuner to adjust output sound intensity of the sound output device.

3. The sharing device as claimed in claim 1, wherein each output unit has a sound input jack.

4. The sharing device as claimed in claim 2, wherein each output unit has a sound input jack.

5. The sharing device as claimed in claim 1, the switching chip further connects with a plurality of LEDs.

6. The sharing device as claimed in claim 1, wherein connections between the distributor and each output unit are performed by cable lines.

* * * * *